(12) United States Patent
Wan

(10) Patent No.: US 12,432,199 B2
(45) Date of Patent: Sep. 30, 2025

(54) DATA PROCESSING METHOD, SYSTEM, APPARATUS AND DEVICE, AND STORAGE MEDIUM

(71) Applicant: Beijing Zitiao Network Technology Co., Ltd., Beijing (CN)

(72) Inventor: Shiqi Wan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/759,743

(22) Filed: Jun. 28, 2024

(65) Prior Publication Data
US 2024/0356912 A1 Oct. 24, 2024

Related U.S. Application Data

(63) Continuation of application No. PCT/CN2023/081072, filed on Mar. 13, 2023.

(30) Foreign Application Priority Data

Mar. 25, 2022 (CN) .......................... 202210321695.8

(51) Int. Cl.
*H04L 9/40* (2022.01)
*G06F 3/0484* (2022.01)
(52) U.S. Cl.
CPC .......... *H04L 63/083* (2013.01); *G06F 3/0484* (2013.01)
(58) Field of Classification Search
None
See application file for complete search history.

(56) References Cited

U.S. PATENT DOCUMENTS 10,861,006 B1 12/2020 Ilincic
2009/0240796 A1* 9/2009 Yokoyama .......... H04L 41/0893
709/223

(Continued)

FOREIGN PATENT DOCUMENTS

CN 106878527 A 6/2017
CN 108234533 A 6/2018

(Continued)

OTHER PUBLICATIONS

International Search Report and Written Opinion for PCT/CN2023/081072, mailed May 24, 2023, 12 pages.

(Continued)

*Primary Examiner* — Tuan S Nguyen
(74) *Attorney, Agent, or Firm* — Astute IP Law Group

(57) ABSTRACT

The present disclosure provides a data processing method, system, apparatus and device, and a storage medium. The method comprises: in response to an association request trigger operation acting on a preset page corresponding to a first account, displaying an association sharing page, wherein at least one communication platform or an association sharing control is displayed on the association sharing page, the association sharing control is used for triggering and displaying the at least one communication platform, and the first account is a current login account of a first client; and in response to a trigger operation for a target communication platform in the at least one communication platform, generating a link corresponding to the first account, and sending the link to a target user by means of the target communication platform.

18 Claims, 6 Drawing Sheets displaying, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on the first client ── S201 in response to a trigger operation for a target communication platform in the at least one communication platform, generating a link corresponding to the first account, and sending the link to a target user through the target communication platform, wherein the link is configured to present an account association page corresponding to the first account on a second client, and the account association page is used to trigger an account association request for a second account corresponding to the second client and the first account ── S202

(56) References Cited

U.S. PATENT DOCUMENTS

| | | | |
|---|---|---|---|
| 2010/0169229 A1* | 7/2010 | Lee | G06Q 10/103 |
| | | | 715/758 |
| 2016/0150575 A1* | 5/2016 | Andersen | G06F 3/04842 |
| | | | 370/329 |
| 2016/0192344 A1 | 6/2016 | Tiger | |
| 2016/0315942 A1* | 10/2016 | Liu | G06F 21/32 |
| 2017/0024991 A1 | 1/2017 | Butte et al. | |
| 2018/0167379 A1 | 6/2018 | Wang | |
| 2019/0311439 A1 | 10/2019 | Quintana et al. | |
| 2022/0083642 A1* | 3/2022 | Wu | G06F 21/45 |

FOREIGN PATENT DOCUMENTS

| | | |
|---|---|---|
| CN | 108322551 A | 7/2018 |
| CN | 108512851 A | 9/2018 |
| CN | 108829528 A | 11/2018 |
| CN | 109067866 A | 12/2018 |
| CN | 110460578 A | 11/2019 |
| CN | 110752963 A | 2/2020 |
| CN | 111859129 A | 10/2020 |
| CN | 112260929 A | 1/2021 |
| CN | 112817671 A | 5/2021 |
| CN | 113204671 A | 8/2021 |
| CN | 113656783 A | 11/2021 |
| CN | 114697045 A | 7/2022 |
| JP | 2021174528 A | 11/2021 |
| WO | 2018/143996 A1 | 8/2018 |

OTHER PUBLICATIONS

Office Action for Chinese Patent Application No. 202210321695.8, mailed Nov. 30, 2023, 26 pages.

Yao et al., "On the Design and Implementation of a User Management Software Based on Android Platform", Journal of Xi'an University of Arts & Science( Nat Sci Ed), vol. 16 No. 1, Jan. 2013, 5 pages.

Notice of Reasons for Refusal for Japanese Application No. 2024-539279, mailed Aug. 19, 2025, 13 pages (6 pages of original document and 7 pages of transalation).

* cited by examiner

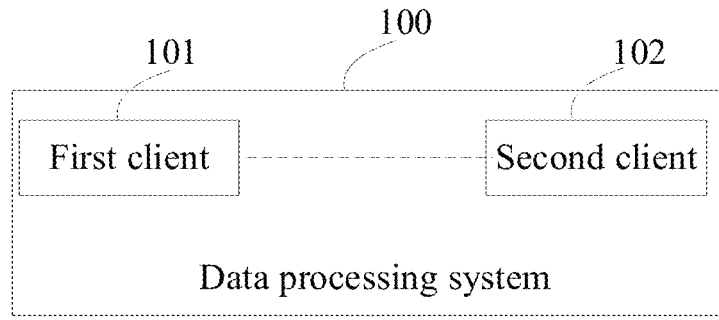

FIG. 1

```
displaying, in response to an association request trigger operation
acting on a preset page corresponding to a first account, an association
sharing page, wherein at least one communication platform or an      ⎯ S201
association sharing control is presented on the association sharing
page, the association sharing control is used to trigger presentation of
the at least one communication platform, and the first account is a
current login account on the first client
```

```
in response to a trigger operation for a target communication platform in
the at least one communication platform, generating a link corresponding
to the first account, and sending the link to a target user through the
target communication platform, wherein the link is configured to present  ⎯ S202
an account association page corresponding to the first account on a
second client, and the account association page is used to trigger an
account association request for a second account corresponding to the
second client and the first account
```

FIG. 2

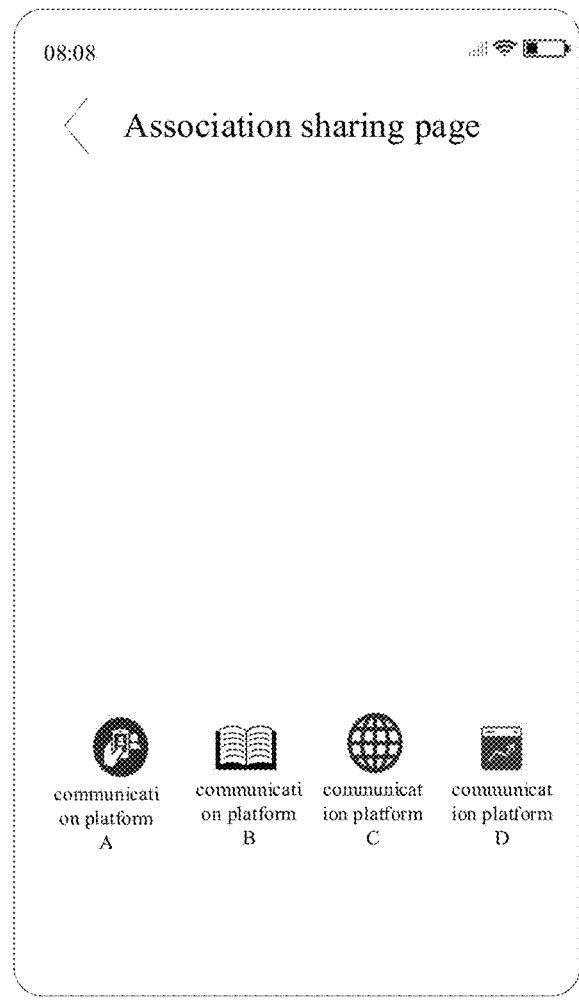

FIG. 4

| presenting an account association page corresponding to a link based on the link, wherein the account association page corresponds to a first account, and the link is sent from a first terminal corresponding to the first account through a target communication platform | — S501 |

| sending, based on an account association acceptance trigger operation acting on the account association page, an account association request for a second account corresponding to the second client and the first account | — S502 |

FIG. 5

DATA PROCESSING METHOD, SYSTEM, APPARATUS AND DEVICE, AND STORAGE MEDIUM

CROSS-REFERENCE TO RELATED APPLICATIONS

The present application is a continuation application of PCT/CN2023/081072 filed Mar. 13, 2023, which claims priority to and is based on a Chinese application with an application number 202210321695.8 and a filing date of Mar. 25, 2022, the aforementioned applications are hereby incorporated by reference in their entireties.

FIELD OF THE INVENTION

The present disclosure relates to the field of data processing, and in particular to data processing method, system, apparatus, device, and storage medium.

BACKGROUND

With the development of Internet services, a user can register accounts on various service platforms, and the technology of association between different accounts is widely concerned. In the related art, establishing an association relationship between different accounts can be done based on face-to-face code scanning and confirmation, so as to manage operation authority by one account for another account.

DISCLOSURE OF THE INVENTION

Embodiments of the present disclosure provide a data processing method, system, apparatus, device, and storage medium.

In a first aspect, the present disclosure provides a data processing method, which is applicable to a first client, and wherein the method may include:
  displaying, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on the first client;
  in response to a trigger operation for a target communication platform in the at least one communication platform, generating a link corresponding to the first account, and sending the link to a target user through the target communication platform, wherein the link is configured to present an account association page corresponding to the first account on a second client, and the account association page is used to trigger an account association request for a second account corresponding to the second client and the first account.

In an embodiment of the present disclosure, before displaying, in response to an association request trigger operation acting on a preset page corresponding to a first account, an association sharing page, the method may further include:
  presenting an account association control on the preset page corresponding to the first account, wherein the preset page includes an authority application page for a preset operation;

Correspondingly, in response to an association request trigger operation acting on a preset page corresponding to a first account, the displaying an association sharing page, may include:
  displaying the association sharing page, in response to a trigger operation for the account association control on the preset page corresponding to the first account.

In a second aspect, the present disclosure further provides a data processing method, which is applicable to a second client, and the method may include:
  presenting an account association page corresponding to a link based on the link, wherein the account association page corresponds to a first account, and the link is sent from a first terminal corresponding to the first account through a target communication platform;
  sending, based on an account association acceptance trigger operation acting on the account association page, an account association request for a second account corresponding to the second client and the first account.

In an embodiment of the present disclosure, the sending, based on an account association acceptance trigger operation acting on the account association page, an account association request for a second account corresponding to the second client and the first account, may include:
  displaying a password input page, in response to the account association acceptance trigger operation acting on the account association page;
  upon receipt of a password input on the password input page, sending the account association request for a second account corresponding to the second client and the first account, wherein the account association request carries the password input on the password input page, the account association request is used to request to verification of the password based on a preset password corresponding to the first account, and an association relationship between the first account and the second account can be established after the verification succeeds.

In an embodiment of the present disclosure, the method may further include:
  receiving an account association response corresponding to the account association request;
  if it is determined that the account association response indicates that the password verification succeeds, displaying an operation control page corresponding to the first account, wherein the operation control page is used to set an operation authority for the first account.

In an embodiment of the present disclosure, the method may further include:
  if it is determined that the account association response indicates that the password verification fails, displaying verification failure prompt information.

In a third aspect, the present disclosure further provides a data processing system, wherein the system may include a first client and a second client;
  the first client can be configured to display, in response to an association request trigger operation acting on a preset page corresponding to a first account, an association sharing page, wherein at least one communication platform or an association sharing control is presented on the association sharing page, the association sharing control is used to trigger presentation of the at least one communication platform, and in response to a trigger operation for a target communication platform in the at least one communication platform, generate a link corresponding to the first account, and send the link to a target user through the target communication platform, wherein the first account is a current login account on the first client;

the second client can be configured to present an account association page corresponding to a link based on the link, and send, based on an account association acceptance trigger operation acting on the account association page, an account association request for a second account corresponding to the second client and the first account.

In an embodiment of the present disclosure, the system may further include:

the second client is specifically configured to display a password input page, in response to the account association acceptance trigger operation acting on the account association page; and upon receipt of a password input on the password input page, send the account association request for a second account corresponding to the second client and the first account, wherein the account association request carries the password input on the password input page, the account association request is used to request to verification of the password based on a preset password corresponding to the first account, and an association relationship between the first account and the second account can be established after the verification succeeds.

In a fourth aspect, the present disclosure further provides a data processing apparatus, which is applicable to a first client, and the apparatus may include:

a first display module configured to display, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on the first client;

a generation module, configured to, in response to a trigger operation for a target communication platform in the at least one communication platform, generate a link corresponding to the first account, and send the link to a target user through the target communication platform, wherein the link is configured to present an account association page corresponding to the first account on a second client, and the account association page is used to trigger an account association request for a second account corresponding to the second client and the first account.

In a fifth aspect, the present disclosure further provides a data processing apparatus, which is applicable to a second client, and the apparatus may include:

a second presentation module, configured to present an account association page corresponding to a link based on the link, wherein the account association page corresponds to a first account, and the link is sent from a first terminal corresponding to the first account through a target communication platform;

a sending module, configured to send, based on an account association acceptance trigger operation acting on the account association page, an account association request for a second account corresponding to the second client and the first account.

In a sixth aspect, the present disclosure provides a computer-readable storage medium, wherein the computer-readable storage medium stores instructions which, when running on a terminal device, cause the terminal device to implement the foregoing method.

In a seventh aspect, the present disclosure provides a data processing device, including a memory and a processor, wherein the memory stores a computer program which, when executed by the processor, causes implementation of the foregoing method.

In an eighth aspect, the present disclosure provides a computer program product, wherein the computer program product includes a computer program/instruction which, when executed by a processor, causes implementation of the foregoing method.

In a ninth aspect, the present disclosure provides a computer program, wherein the computer program includes program codes which, when executed by a processor, causes implementation of the foregoing method.

DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the embodiments of the present disclosure or the technical solutions in the prior art, the drawings used in the description of the embodiments or the prior art will be briefly described below, and obviously, those ordinary skilled in the art may obtain other drawings based on the accompanying drawings without creative efforts.

FIG. 1 is a schematic structural diagram of a data processing system according to an embodiment of the present disclosure;

FIG. 2 is a flowchart of a data processing method according to an embodiment of the present disclosure;

FIG. 4 is a schematic diagram of another account association page according to an embodiment of the present disclosure;

FIG. 5 is a flowchart of another data processing method according to an embodiment of the present disclosure;

DETAILED DESCRIPTION OF PREFERRED EMBODIMENTS

Figure 3:
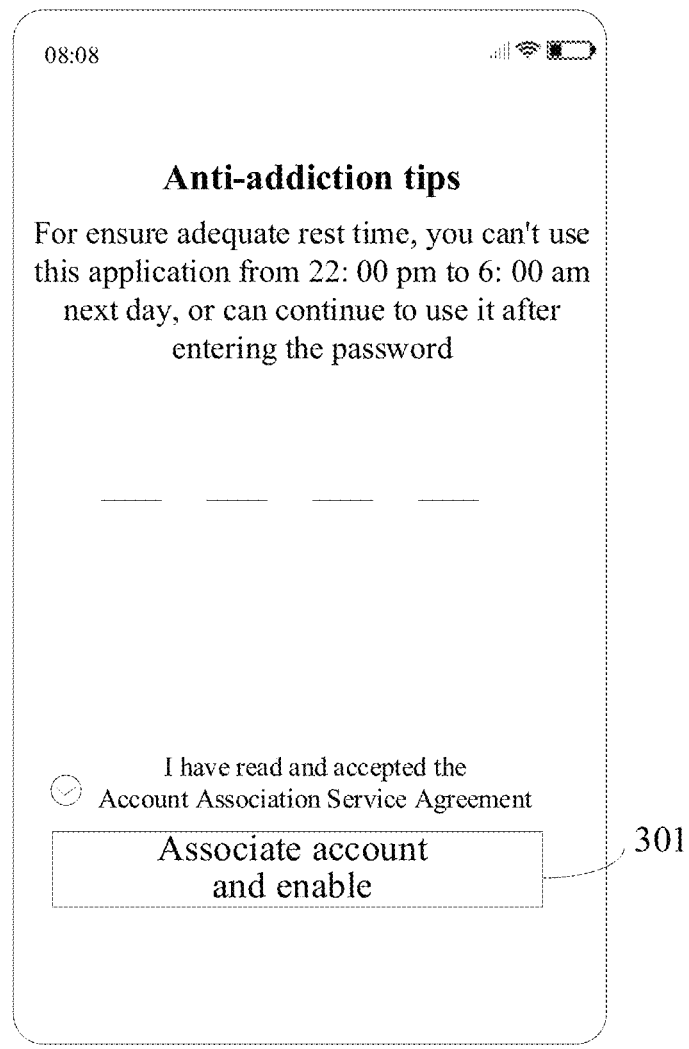
FIG. 3 is a schematic diagram of an account association page according to an embodiment of the present disclosure.

In order to understand the above objects, features and advantages of the present disclosure more clearly, the solutions of the present disclosure will be further described below. It should be noted that, in the case of no conflict, the embodiments of the present disclosure and the features in the embodiments may be combined with each other.

Many specific details are set forth in the following description to fully understand the present disclosure, but the present disclosure may also be implemented in other manners different from those described herein; obviously, the embodiments in the specification are only a part of the embodiments of the present disclosure, rather than all of the embodiments.

At present, establishing an association relationship between different accounts is done based on face-to-face code scanning and confirmation, so that management for an operation authority of another account by one account can be implemented, but the application scenario has a certain limitation and cannot meet the account association requirement of the user.

To this end, the present disclosure provides a data processing method, which displays, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on the first client, in response to a trigger operation for a target communication platform in the at least one communication platform, generate a link corresponding to the first account, and send the link to a target user through the target communication platform, wherein the link is configured to present an account association page corresponding to the first account on a second client, and the account association page is used to trigger an account association request for a second account corresponding to the second client and the first account. In the present disclosure, the association sharing page can be displayed based on the association request trigger operation on the preset page corresponding to the first account, and the corresponding link can be generated and sent to the target user based on the communication platform, so that the corresponding account association page can be presented on the second client based on the link, therefore, remote application association between different accounts can be realized, and the requirements of the user for remote applying and associating accounts are met.

To facilitate understanding of the overall solution, a data processing system according to an embodiment of the present disclosure will be described with reference to FIG. 1, specifically, the data processing system includes a first client and a second client, and FIG. 1 is a schematic structural diagram of a data processing system according to an embodiment of the present disclosure.

The data processing system 100 includes a first client 101 and a second client 102.

Specifically, the first client 101 can be configured to display, in response to an association request trigger operation acting on a preset page corresponding to a first account, an association sharing page, wherein at least one communication platform or an association sharing control is presented on the association sharing page, the association sharing control is used to trigger presentation of the at least one communication platform, and in response to a trigger operation for a target communication platform in the at least one communication platform, generate a link corresponding to the first account, and send the link to a target user through the target communication platform, wherein the first account is a current login account on the first client.

The second client 102 can be configured to present an account association page corresponding to a link based on the link, and send, based on an account association acceptance trigger operation acting on the account association page, an account association request for a second account corresponding to the second client and the first account.

In an embodiment of the present disclosure, the first client displays, in response to an association request trigger operation acting on a preset page corresponding to a first account, an association sharing page, and then sends the link to a target user through the target communication platform in the association sharing page.

Upon receiving the link sent by the first client, the second client triggers the link to complete the association between the first account and the second account, specifically, after receiving the link sent by the first client, the second client display a password input page, in response to the account association acceptance trigger operation acting on the account association page; and upon receipt of a password input on the password input page, send the account association request for a second account corresponding to the second client and the first account, wherein the account association request carries the password input on the password input page, the account association request is used to request to verification of the password based on a preset password corresponding to the first account, and an association relationship between the first account and the second account can be established after the verification succeeds.

In the data processing system according to an embodiment of the present disclosure, the first client can display, based on an association request trigger operation acting on a preset page corresponding to a first account, an association sharing page, and then generate and send a corresponding link based on the target communication platform to a target user, and after receiving the link sent by the first client, the target user triggers the link to complete an association between the first account and the second account, thereby implementing remote application association requirements between different accounts.

A data processing method according to an embodiment of the present disclosure will be described below with reference to FIG. 2, which is a flowchart of a data processing method according to an embodiment of the present disclosure, the data processing method can be applied to the first client, and the method may include:

S201: displaying, in response to an association request trigger operation acting on a preset page corresponding to a first account, an association sharing page.

Wherein, at least one communication platform or an association sharing control is presented on the association sharing page, the association sharing control is used to trigger presentation of the at least one communication platform, and the first account is a current login account on the first client.

The first account may be composed of digits, letters, or symbols, which is not limited in the present disclosure; the preset page may include an authority application page for a preset operation, and the authority application page for the preset operation may be used to apply for authority management of the preset operation, for example, an authority application page for limiting a browsing time, etc. The preset page corresponding to the first account may refer to a preset page presented on the first client after a user of the first account has logged in the first client.

In an embodiment of the present disclosure, when an association request triggered on the preset page corresponding to the first account is received, the preset page is triggered to jump to the association sharing page, and the association sharing page is displayed.

In the embodiments of the present disclosure, the association request trigger operation may include a plurality of manners, for example, Manner 1: trigger a long-press operation at any blank position on a preset page corresponding to the first account, and display at least one communication platform or an association sharing control; Manner 2: trigger a click operation on an account association control disposed on a preset page corresponding to the first account, wherein the account association control may be disposed at any position on a preset page corresponding to the first account (for example, a lower right corner, a right below position, etc. of the preset page), and the account association control can be in any shape (such as a square, a circle, etc.); and the like.

It should be noted that, the specific style and the specific position of the account association control disposed on the preset page corresponding to the first account are not limited in embodiments of the present disclosure.

FIG. 3 is a schematic diagram of an account association page according to an embodiment of the present disclosure, wherein the preset page is an anti-addiction page corresponding to the first account, and in order to ensure the user of the first account has enough rest time, for example, it can be configured that the application is disabled during the period from every day 22 P.M. to the next day 6 A.M., and the anti-addiction function may be set by a user of the second client based on the password. If the user of the first account needs to use the application on 23 P.M., the user of the first account may continue to use by inputting a password, but because the password is set by the user of the second client, the first account may apply for association with the second account of the second client user, and after the association succeeds, the second account can manage the authority of the first account. Meanwhile, an account association control 301 can be arranged at a right below part in the page, the account association control can be configured as a rectangular style, and when a click operation for an account association control on a preset page corresponding to the first account is received, the association sharing page can be displayed.

S202: in response to a trigger operation for a target communication platform in the at least one communication platform, generating a link corresponding to the first account, and sending the link to a target user through the target communication platform.

Wherein, the link is configured to present an account association page corresponding to the first account on a second client, and the account association page is used to trigger an account association request for a second account corresponding to the second client and the first account.

In the embodiments of the present disclosure, after the association sharing page is displayed, based on trigging the association request operation on the preset page corresponding to the first account based on the step S201, a target communication platform in the at least one communication platform can be selected in the association sharing page for trigger operation, a link corresponding to the first account can be generated, and the link can be sent to the target user through the target communication platform.

FIG. 4 is a schematic diagram of another account association page according to an embodiment of the present disclosure, wherein icons and names of different communication platforms (such as a communication platform A) are disposed at right below parts in the account association page, and a link corresponding to the first account can be generated when a click operation on the target communication platform A is received.

In this embodiment of the present disclosure, the account association page may be provided with an association sharing control for triggering display of at least one communication platform to generate a link corresponding to the first account. Among them, the link may be a two-dimensional code, the two-dimensional code can be sent to the target user through the target communication platform, and the second client can associate the current login account (the second account) of the second client with the first account by identifying the two-dimensional code; the link can further generate a specific link based on different communication platforms, the specific link can be sent to the target user through the target communication platform, and after the target user clicks the specific link on the target communication platform, the target user can automatically jump to the second client account association page, associating the current login account (the second account) of the second client with the first account, by the account association acceptance trigger operation on the account association page.

In order to understand the present disclosure more clearly, the following uses an actual application scenario as an example for explanation, for example: in order to prevent eye fatigue, the target user K can perform authority management on the login account of the user M in a password setting mode, so that the user M operates on the eye protection page, and it is set that each usage duration of the user M does not exceed 40 minutes, and each use interval is 20 minutes, when the user M logins its account for usage, if the use time exceeds 40 minutes, then the user may be prompted that "the application is close, and will start after 20 minutes", if the user M still needs to continue to access the application, then the users M can associate the login account of the target user K so that the target user K can remotely perform authority management for the login account of the user M.

Specifically, the user M can trigger the association request on the eye protection page to cause the association sharing page to be displayed, select the communication platform B in the association sharing page for generating the link corresponding to the login account of the user M, and send the link to the target user K through the communication platform B; after clicking the link on the communication platform B, the target user K can automatically jump to the account association page, click the acceptance association on the account association page to cause the password input page to be displayed; at this time, the target user K needs to input the password for verification, and after the verification succeeds, the operation control page corresponding to the account of the user M can be displayed, and at this time, the target user K can remotely perform authority management for the login account of the user M.

In the data processing method according to the embodiments of the present disclosure, in response to an association request trigger operation acting on a preset page corresponding to the first account, the association sharing page is displayed, and in response to a trigger operation for the target communication platform in the at least one communication platform, a link corresponding to the first account is generated, and the link is sent to the target user through the target communication platform. In the present disclosure, the association sharing page is displayed based on the association request trigger operation on the preset page corresponding to the first account, and the corresponding link is generated and sent to the target user based on the target communication platform, thereby meeting the remote application requirement of the first account.

In order to facilitate further understanding of a data processing method provided in an embodiment of the present disclosure, a data processing method according to an embodiment of the present disclosure will be described with reference to FIG. 5, which is a flowchart of another data processing method according to an embodiment of the present disclosure, the data processing method can be applied to the second client, and the method may include:

S501: presenting an account association page corresponding to a link based on the link.

Wherein, the account association page corresponds to a first account, and the link is sent from a first terminal corresponding to the first account through a target communication platform.

In an embodiment of the present disclosure, after receiving the link sent from the first client target through the target communication platform, the account association page corresponding to the link is presented based on the link.

Figure 6:
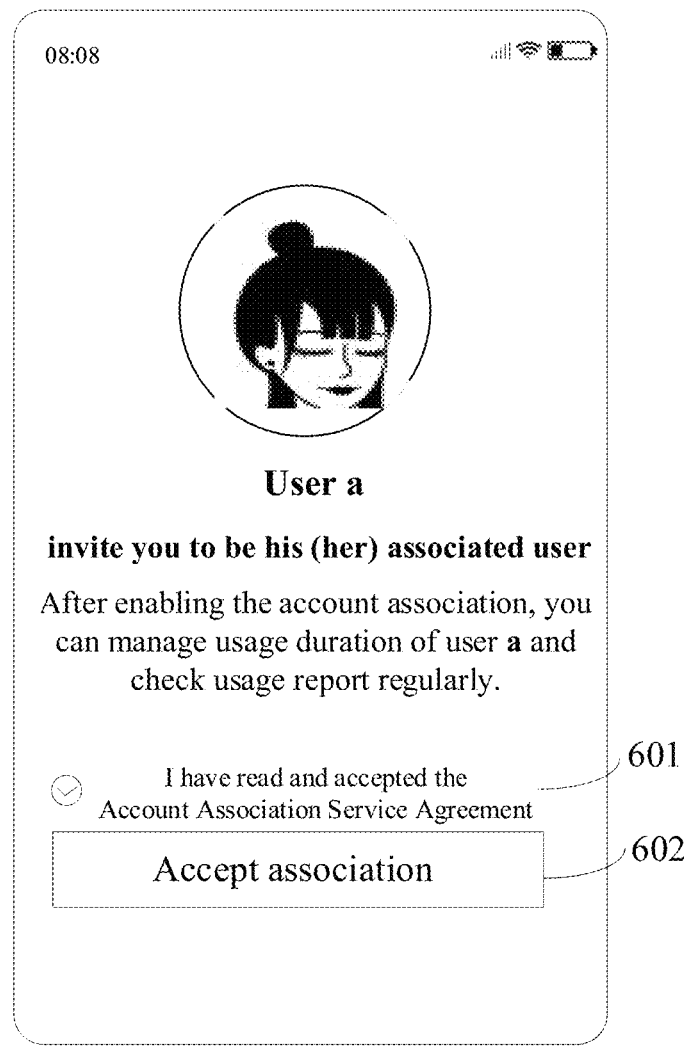
FIG. 6 is a schematic diagram of still another account association page according to an embodiment of the present disclosure.

FIG. 6 is a schematic diagram of still another account association page according to an embodiment of the present disclosure, wherein a head portrait and a nickname of a user (such as user A) of the first account user are disposed on the account association page, and the head portrait and the nickname may be autonomously set by the user of the first account or automatically generated by the system, which will not be limited herein; at the middle part, there may be provided prompt information, such as "inviting you to become an associated user of him (her)", and prompting "after the account association is enabled, you can manage the usage duration of the user A, and periodically view the usage report"; the account association service protocol control 601 and the receiving association control 602 can be disposed at the right below part, and when the association is received, the account association service protocol control can be first triggered to know specific account association service contents, such as the specific function description, service application flow, user usage notice, etc., in order to facilitate the target user to read the account association service protocol contents, the specific account association service contents may be presented in the form of a pop-up window, which will not be limited in the present disclosure.

S502: sending, based on an account association acceptance trigger operation acting on the account association page, an account association request for a second account corresponding to the second client and the first account.

In the embodiment of the present disclosure, the account association acceptance trigger operation can be executed on the account association page, a password input page can be displayed, and after the password input on the password input page is received, the account association request for the second account corresponding to the second client and the first account can be sent, wherein the account association request carries the password input on the password input page, the account association request is used for requesting verification of the password based on a preset password corresponding to the first account, and the association relationship between the first account and the second account can be established after the verification succeeds.

It should be noted that the preset password can be preset by the target user, and the preset password may be a combination of digits, letters, and symbols, which is not limited in the present disclosure.

Figure 7:
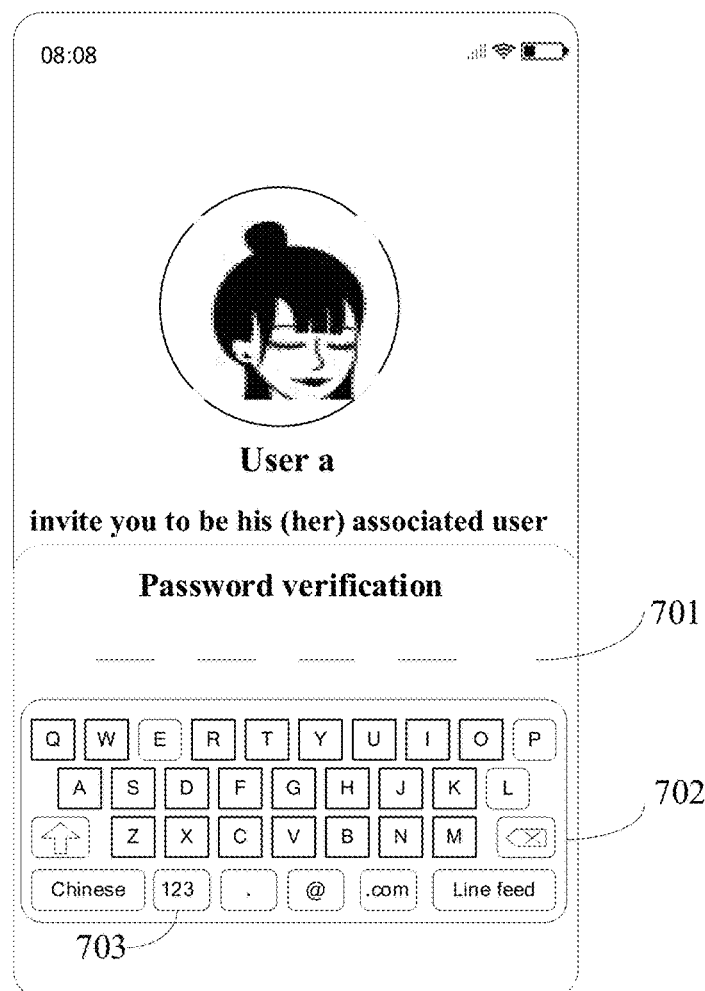
FIG. 7 is a schematic diagram of still another account association page according to an embodiment of the present disclosure.

In the embodiment of the present disclosure, when the account association acceptance trigger operation is executed on the account association page, the password input page is popped up, and FIG. 7 is a schematic diagram of another account association page according to an embodiment of the present disclosure, and a password verification control 701 is provided in the middle of the password input page for inputting a password for verification; a keyboard control 702 is arranged in the lower part of the password input page, when the user needs to input a letter, a corresponding letter can be selected according to the needs, when the user needs to input the digits, a digital control 703 in the diagram can be clicked to trigger the digital pop-up window, and all digits can be displayed for the user to select.

In an embodiment of the present disclosure, after receiving the password input on the password input page, if it is determined that the account association response indicates that the password verification succeeds, then the operation control page corresponding to the first account can be displayed, wherein the operation control page is used to set the operation authority of the first account.

In an embodiment of the present disclosure, after receiving the password input on the password input page, then it is verified whether the password is consistent with the preset password corresponding to the first account, and if "YES", then "password verification is successful" is prompted to complete the association between the first account and the second account, and the operation control page corresponding to the first account is displayed.

As an example, after the password, for example, 1234, input on the password input page is received, it is verified whether the password is consistent with the preset password corresponding to the first account, and if they are consistent, then the verification is successful, the operation control page corresponding to the first account can be displayed, at this time, the second account can manage the operation authority of the first account, for example, the browsing duration can be set, the browsing duration does not exceed 1 hour every time, the daily accumulated browsing duration does not exceed 2 hours, and if the daily accumulated browsing duration exceeds 2 hours for the user of the first account, it is prompted the system is locked and the browsing cannot continue, even after the user of the first account restarts the system or replaces a corresponding device, the system still cannot continue to use.

In an embodiment of the present disclosure, after the password input on the password input page is received, if it is determined that the account association response indicates the password verification fails, verification failure prompt information will be displayed.

In an embodiment of the present disclosure, after receiving the password input on the password input page, then it is verified whether the password is consistent with the preset password corresponding to the first account, and if "NO", then it is determined the password verification fails, and password error information is prompted. In addition, the number of inputting password can be limited, for example, upper limit numbers of incorrect password inputting is five times, when the password is incorrectly input once or twice, it can be prompted "password error, please input again", and when the password is incorrectly input three times, it can be prompted "incorrect input three times, twice remaining", and when the password is incorrectly input four times, it can be prompted "incorrect input four times, only one chance remaining", and when the password is incorrectly input five times, it can be prompted "upper limit of input times are reached, please try again tomorrow".

It should be noted that, if the target user forgets the preset password, the preset password may be retrieved based on the information associated with the target user or may be reset, which will not be limited in the present disclosure.

In the data processing method provided by the embodiments of the present disclosure, the account association page corresponding to the link is displayed based on the link, and the account association request for the second account corresponding to the second client and the first account is sent based on the account association acceptance trigger operation acting on the account association page, the present disclosure can verify the target user based on the preset password, thereby improving the accuracy of account association.

Figure 8:
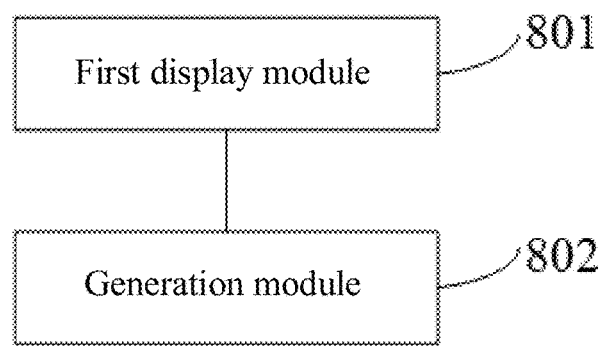
FIG. 8 is a schematic structural diagram of a data processing apparatus according to an embodiment of the present disclosure.

The present disclosure further provides a data processing apparatus, and FIG. 8 is a schematic structural diagram of a data processing apparatus according to an embodiment of the present disclosure, specifically, the apparatus may include:

a first display module 801, configured to display, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on the first client;

a generation module 802, configured to, in response to a trigger operation for a target communication platform in the at least one communication platform, generate a link corresponding to the first account, and send the link to a target user through the target communication platform, wherein the link is configured to present an account association page corresponding to the first account on a second client, and the account association page is used to trigger an account association request for a second account corresponding to the second client and the first account.

In the embodiments of the present disclosure, the apparatus may further include:

a first presentation module, configured to present an account association control on the preset page corresponding to the first account, wherein the preset page includes an authority application page for a preset operation; and Correspondingly, the first display module can be specifically configured to:

display the association sharing page, in response to a trigger operation for the account association control on the preset page corresponding to the first account.

Figure 9:
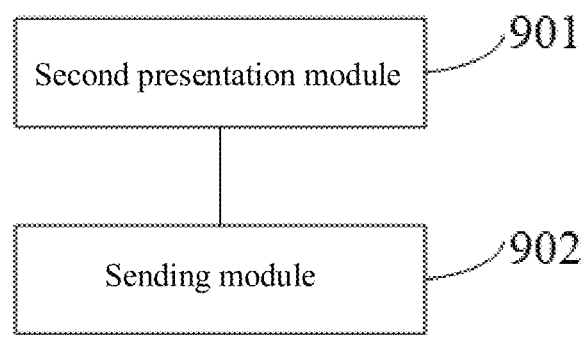
FIG. 9 is a schematic structural diagram of another data processing apparatus according to an embodiment of the present disclosure.

In addition, embodiments of the present disclosure further provide a data processing apparatus, and FIG. 9 is a schematic structural diagram of another data processing apparatus according to an embodiment of the present disclosure, specifically, the apparatus may include:

a second presentation module 901, configured to present an account association page corresponding to a link based on the link, wherein the account association page corresponds to a first account, and the link is sent from a first terminal corresponding to the first account through a target communication platform;

a sending module 902, configured to send, based on an account association acceptance trigger operation acting on the account association page, an account association request for a second account corresponding to the second client and the first account.

Correspondingly, the sending module 902 includes:

a display submodule, configured to display a password input page, in response to the account association acceptance trigger operation acting on the account association page; and a sending submodule, configured to, upon receipt of a password input on the password input page, send the account association request for a second account corresponding to the second client and the first account, wherein the account association request carries the password input on the password input page, the account association request is used to request to verification of the password based on a preset password corresponding to the first account, and an association relationship between the first account and the second account can be established after the verification succeeds.

In an embodiment of the present disclosure, the apparatus may further include:

a receiving module, configured to receive an account association response corresponding to the account association request;

a second display module, configured to, if it is determined that the account association response indicates that the password verification succeeds, display an operation control page corresponding to the first account, wherein the operation control page is used to set an operation authority for the first account.

In an embodiment of the present disclosure, the apparatus may further include:

if it is determined that the account association response indicates that the password verification fails, displaying verification failure prompt information.

It should be noted that the above-mentioned modules are only logical modules divided according to the specific functions they realize, instead of being used to limit specific implementation, for example, they can be implemented in software, hardware, or a combination of software and hardware. In actual implementation, each of the above modules may be implemented as an independent physical entity, or may also be implemented by a single entity (for example, a processor (CPU or DSP, etc.), an integrated circuit, etc.). In addition, the above-mentioned modules are shown with dotted lines in the drawings to indicate that these modules may not actually exist, and the operations/functions they realized may be implemented by the apparatus or the processing circuit itself.

In addition, although not shown, the apparatus may also include a memory that can store various information generated by the apparatus, various modules included in the apparatus during operation, programs and data for operations, data to be transmitted by the communication unit, etc. The memory can be volatile memory and/or non-volatile memory. For example, memory may include, but is not limited to, random access memory (RAM), dynamic random-access memory (DRAM), static random-access memory (SRAM), read only memory (ROM), flash memory. Of course, the memory could also be located outside the apparatus.

An embodiment of the present disclosure further provides a data processing medium, wherein the computer-readable storage medium stores instructions therein, and the instructions, when running on a terminal device, cause the terminal device to implement the data processing method according to embodiments of the present disclosure.

An embodiment of the present disclosure further provides a data processing device, including a memory and a processor, wherein the memory stores computer programs, and the computer programs, when executed by the processor, can cause implementation of the data processing method according to embodiments of the present disclosure.

An embodiment of the present disclosure further provides a computer program product, wherein the computer program product includes computer programs/instructions, and the computer programs/instructions, when executed by a processor, cause implementation of the data processing method according to embodiments of the present disclosure.

An embodiment of the present disclosure further provides a computer program, wherein the computer program includes program codes, which, when executed by a processor, cause implementation of the data processing method according to embodiments of the present disclosure.

Figure 10:
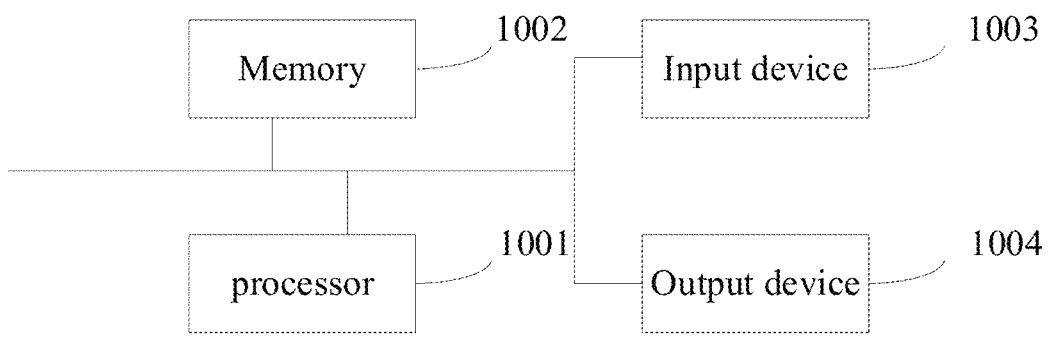
FIG. 10 is a schematic structural diagram of a data processing device according to an embodiment of the present disclosure.

In addition, an embodiment of the present disclosure further provides a data processing device, as shown in FIG. 10, the data processing device may include:

a processor 1001, a memory 1002, an input device 1003, and an output device 1004. There may be one or more processors 1001 in the data processing device, and FIG. 10 takes one processor as an example. In some embodiments of the present disclosure, the processor 1001, the memory 1002, the input apparatus 1003, and the output apparatus 1004 may be connected by using a bus or other manners, wherein FIG. 10 takes the bus connection as an example.

The memory 1002 may be configured to store software programs and modules, and the processor 1001 may execute various functional applications and data processing of the data processing device, by running the software programs and the modules stored in the memory 1002. The memory 1002 may mainly include a program storage area and a data storage area, wherein the program storage area may store an operating system, an application program required by at least one function, and the like. In addition, the memory 1002 may include a high-speed random-access memory, and may further include a non-volatile memory, for example, at least one magnetic disk storage device, a flash memory device, or another volatile solid-state storage device. The input device 1003 may be configured to receive input digit or character information, and generate signal inputs related to user setting and function control for the data processing device.

Specifically, in this embodiment, the processor 1001 loads executable files corresponding to processes of one or more applications into the memory 1002 according to the following instructions, and runs the applications stored in the memory 1002 by the processor 1001, to implement various functions of the data processing device.

It should be noted that, in this specification, relational terms such as "first" and "second" are only used to distinguish one entity or operation from another entity or operation, and do not necessarily require or imply that there is any actual relationship or order between these entities or operations. Moreover, the terms "include", "comprise" or any other variations thereof are intended to cover a non-exclusive inclusion, so that a process, method, article, or device that includes a series of elements not only includes those elements, but also includes other elements not explicitly listed, or further includes elements inherent to the process, method, article, or device. In the absence of more restrictions, the element defined by the statement "includes one . . ." does not preclude the existence of additional identical elements in the process, method, article, or device that includes the element.

The foregoing descriptions are merely specific implementations of the present disclosure, so as to enable a person skilled in the art to understand or implement the present disclosure. Various modifications to these embodiments will be readily apparent to those skilled in the art, and the generic principles defined herein may be implemented in other embodiments without departing from the spirit or scope of the disclosure. Thus, the present disclosure will not be limited to the embodiments described herein, but is to be accorded the widest scope consistent with the principles and novel features disclosed herein.

What is claimed is:

1. A data processing method, wherein the method comprises:
displaying, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on a first client, wherein the preset page comprises an authority application page for a preset operation set by a target user on a second client;
in response to a trigger operation for a target communication platform in the at least one communication platform, generating a link corresponding to the first account, and sending the link to the second client through the target communication platform, wherein the link is configured to present an account association page corresponding to the first account on the second client, and the account association page is used to trigger an account association request for a second account corresponding to the target user on the second client and the first account, wherein the account association request is triggered in response to the target user inputting a password and is used for requesting verification of the password input by the target user based on a preset password corresponding to the first account, and the association relationship between the first account and the second account is established after the verification succeeds, wherein in response to an association relationship between the first account and the second account being established, an authority of the first account is managed by the second account.

2. The method of claim 1, wherein, before the displaying, in response to an association request trigger operation acting on a preset page corresponding to a first account, an association sharing page, the method further comprises:
presenting an account association control on the preset page corresponding to the first account; and
the displaying, in response to an association request trigger operation acting on a preset page corresponding to a first account, an association sharing page, comprises:
displaying the association sharing page, in response to a trigger operation for the account association control on the preset page corresponding to the first account.

3. The method of claim 1, further comprising;
receiving the account association request for the second account corresponding to the target user on the second client and the first account from the second client that is triggered on the account association page.

4. The method of claim 3, wherein, the account association request for the second account corresponding to the target user on the second client and the first account is triggered by:

displaying a password input page, in response to an account association acceptance trigger operation acting on the account association page;

upon receipt of a password by the target account input on the password input page, sending the account association request for the second account corresponding to the target account on the second client and the first account, wherein the account association request carries the password input on the password input page.

5. The method of claim 1, wherein, the method further comprises:

sending an account association response corresponding to the account association request to the second client;

wherein in response to the account association response indicating that the password verification succeeds, an operation control page corresponding to the first account is displayed at the second client, wherein the operation control page is used to set an operation authority for the first account.

6. The method of claim 5, wherein, in response to the account association response indicating that the password verification fails, verification failure prompt information is displayed at the second client.

7. A non-transitory computer-readable storage medium having instructions stored thereon, wherein the instructions, when running on a processor, causes implementation of displaying, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on a first client, wherein the preset page comprises an authority application page for a preset operation set by a target user on a second client;

in response to a trigger operation for a target communication platform in the at least one communication platform, generating a link corresponding to the first account, and sending the link to the second client through the target communication platform, wherein the link is configured to present an account association page corresponding to the first account on the second client, and the account association page is used to trigger an account association request for a second account corresponding to the target user on the second client and the first account, wherein the account association request is triggered in response to the target user inputting a password and is used for requesting verification of the password input by the target user based on a preset password corresponding to the first account, and the association relationship between the first account and the second account is established after the verification succeeds, wherein in response to an association relationship between the first account and the second account being established, an authority of the first account is managed by the second account.

8. The non-transitory computer-readable storage medium of claim 7, wherein, before the displaying, in response to an association request trigger operation acting on a preset page corresponding to a first account, an association sharing page, the instructions, when running on a processor, causes implementation of:

presenting an account association control on the preset page corresponding to the first account; and the displaying, in response to an association request trigger operation acting on a preset page corresponding to a first account, an association sharing page, comprises:

displaying the association sharing page, in response to a trigger operation for the account association control on the preset page corresponding to the first account.

9. The non-transitory computer-readable storage medium of claim 7, wherein the instructions, when running on a processor, causes implementation of:

receiving the account association request for the second account corresponding to the target user on the second client and the first account from the second client that is triggered on the account association page.

10. The non-transitory computer-readable storage medium of claim 9, wherein, the account association request for the second account corresponding to the target user on the second client and the first account is triggered by:

displaying a password input page, in response to an account association acceptance trigger operation acting on the account association page;

upon receipt of a password by the target account input on the password input page, sending the account association request for the second account corresponding to the target account on the second client and the first account, wherein the account association request carries the password input on the password input page.

11. The non-transitory computer-readable storage medium of claim 10, wherein the instructions, when running on a processor, causes implementation of:

sending an account association response corresponding to the account association request to the second client;

wherein, in response to the account association response indicating that the password verification succeeds, an operation control page corresponding to the first account is displayed at the second client, wherein the operation control page is used to set an operation authority for the first account.

12. The non-transitory computer-readable storage medium of claim 11, wherein, in response to the account association response indicating that the password verification fails, verification failure prompt information is displayed at the second client.

13. A electronic device, comprising:

a processor;

a memory that stores computer programs;

wherein the computer programs, when executed by the processor, cause implementation of displaying, in response to an association request trigger operation acting on a preset page corresponding to a first account, an association sharing page, wherein at least one communication platform or an association sharing control is presented on the association sharing page, the association sharing control is used to trigger presentation of the at least one communication platform, and the first account is a current login account on a first client, wherein the preset page comprises an authority application page for a preset operation set by a target user on a second client;

in response to a trigger operation for a target communication platform in the at least one communication platform, generating a link corresponding to the first account, and sending the link to the second client through the target communication platform, wherein the link is configured to present an account association page corresponding to the first account on the second client, and the account association page is used to trigger an account association request for a second account corresponding to the target user on the second client and the first account, wherein the account association request is triggered in response to the target user inputting a password and is used for requesting verification of the password input by the target user based on a preset password corresponding to the first account, and the association relationship between the first account and the second account is established after the verification succeeds, wherein in response to an association relationship between the first account and the second account being established, an authority of the first account is managed by the second account.

14. The electronic device of claim 13, wherein, before the displaying, in response to an association request trigger operation acting on a preset page corresponding to a first account, an association sharing page, the computer programs, when executed by the processor, cause implementation of:

presenting an account association control on the preset page corresponding to the first account; and the displaying, in response to an association request trigger operation acting on a preset page corresponding to a first account, an association sharing page, comprises:

displaying the association sharing page, in response to a trigger operation for the account association control on the preset page corresponding to the first account.

15. The electronic device of claim 13, wherein the computer programs, when executed by the processor, cause implementation of:

receiving the account association request for the second account corresponding to the target user on the second client and the first account from the second client that is triggered on the account association page.

16. The electronic device of claim 15, wherein, the account association request for the second account corresponding to the target user on the second client and the first account is triggered by:

displaying a password input page, in response to an account association acceptance trigger operation acting on the account association page;

upon receipt of a password by the target account input on the password input page, sending the account association request for the second account corresponding to the target account on the second client and the first account, wherein the account association request carries the password input on the password input page.

17. The electronic device of claim 16, wherein the computer programs, when executed by the processor, cause implementation of:

sending an account association response corresponding to the account association request to the second client;

wherein, in response to the account association response indicating that the password verification succeeds, an operation control page corresponding to the first account is displayed at the second client, wherein the operation control page is used to set an operation authority for the first account.

18. The electronic device of claim 17, wherein, in response to the account association response indicating that the password verification fails, verification failure prompt information is displayed at the second client.

* * * * *